United States Patent
Kim et al.

(10) Patent No.: US 11,956,859 B2
(45) Date of Patent: *Apr. 9, 2024

(54) APPARATUS AND METHOD FOR SUPPORTING CONTINUITY OF EDGE COMPUTING SERVICE IN MOBILE NETWORK

(71) Applicant: Samsung Electronics Co., Ltd., Suwon-si (KR)

(72) Inventors: Hyesung Kim, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,646

(22) Filed: Jan. 5, 2023

(65) Prior Publication Data

US 2023/0147622 A1 May 11, 2023

Related U.S. Application Data

(63) Continuation of application No. 17/444,886, filed on Aug. 11, 2021, now Pat. No. 11,553,560.

(30) Foreign Application Priority Data

Aug. 13, 2020 (KR) ........................ 10-2020-0102073

(51) Int. Cl.
*H04W 80/10* (2009.01)
*H04L 5/00* (2006.01)
(Continued)

(52) U.S. Cl.
CPC ........... *H04W 80/10* (2013.01); *H04L 5/0055* (2013.01); *H04L 67/145* (2013.01); *H04L 67/148* (2013.01); *H04W 80/02* (2013.01)

(58) Field of Classification Search
None
See application file for complete search history.

(56) References Cited

U.S. PATENT DOCUMENTS

2019/0373505 A1  12/2019  Jun et al.
2020/0221527 A1   7/2020  Bharatia et al.
(Continued)

FOREIGN PATENT DOCUMENTS

KR   10-2021-0023608 A   3/2021
WO     2019161882 A1      8/2019
(Continued)

OTHER PUBLICATIONS

International Search Report and Written Opinion of the International Searching Authority dated Nov. 23, 2021, in connection with International Application No. PCT/KR2021/010644, 6 pages.
(Continued)

*Primary Examiner* — Cheikh T Ndiaye

(57) ABSTRACT

Methods and an apparatus for providing an edge computing service to a UE in a mobile communication network and. The method comprises: receiving, from an AMF, a PDU session modification command including first information instructing modification of a PUD session for the MEC service and valid time of the PDU session; transmitting, to the AMF, a PDU session modification command NACK message including second information indicating a wait until transmission of an ACK, when relocation of an application context corresponding to the PDU session is possible within the valid time of the PDU session; transmitting, to an MEC system providing the service, an application context relocation request message; and transmitting, to the AMF, a PDU session modification command ACK in response to receiving an application context relocation complete message from the MEC system, wherein the PDU session
(Continued)

modification command and the PDU session modification command NACK message are NAS messages.

13 Claims, 10 Drawing Sheets

(51) Int. Cl.
*H04L 67/145* (2022.01)
*H04L 67/148* (2022.01)
*H04W 80/02* (2009.01)

(56) References Cited

U.S. PATENT DOCUMENTS

2020/0252900 A1  8/2020  Kim et al.
2021/0058489 A1  2/2021  Kim et al.

FOREIGN PATENT DOCUMENTS

| WO | WO-2019161882 A1 * | 8/2019 | ........ H04W 36/0066 |
| WO | 2019195817 A1 | 10/2019 | |
| WO | WO-2019195817 A1 * | 10/2019 | ............. H04L 67/10 |
| WO | 2021204510 A1 | 10/2021 | |
| WO | WO-2021204510 A1 * | 10/2021 | ........... H04L 67/148 |

OTHER PUBLICATIONS

3GPP TS 23.502 V16.5.0 (Jul. 2020), Technical Specification, 3rd Generation Partnership Project; Technical Specification Group Services and System Aspects; Procedures for the 5G System (5GS); Stage 2 (Release 16), Jul. 2020, 594 pages.

3GPP TS 23.558 V0.4.0 (Aug. 2020), Technical Specification, 3rd Generation Partnership Project; Technical Specification Group Services and System Aspects; Architecture for enabling Edge Applications; (Release 17), Aug. 2020, 98 pages.

* cited by examiner

APPARATUS AND METHOD FOR SUPPORTING CONTINUITY OF EDGE COMPUTING SERVICE IN MOBILE NETWORK

CROSS-REFERENCE TO RELATED APPLICATIONS

This application is a continuation of application Ser. No. 17/444,886, filed Aug. 11, 2021, now U.S. Pat. No. 11,553,560 issued Jan. 10, 2023, which is based on and claims priority under 35 U.S.C. § 119 to Korean Patent Application No. 10-2020-0102073, filed on Aug. 13, 2020, in the Korean Intellectual Property Office, the disclosure of which are herein incorporated by reference in their entirety.

BACKGROUND

1. Field

The disclosure relates to a method and an apparatus for providing an edge computing service to a user equipment (UE) in a mobile communication network and, more particularly, to a method and an apparatus for providing the continuity of an edge computing service to a UE.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The disclosure relates to a communication system, in which a terminal, for example, a user equipment (UE), may establish a data connection to an edge data network at a location close to the location thereof in order to use a low-latency or broadband service. Further, in the edge computing system, the terminal may access an application server run in an edge hosting environment or an edge computing platform operated by an edge enabler server of the edge data network, thereby being provided with a data service. Here, the terminal to access the edge computing system may be a mobile communication terminal that is provided with a mobile communication service.

A mobile communication terminal provides the mobility of a user. Thus, a UE may move along with a moving user. In this case, a mobile edge computing (MEC) system needs to provide the continuity of an edge computing system service to the UE.

However, a specific procedure for a method for providing the continuity of an edge computing service is not defined.

The above information is presented as background information only to assist with an understanding of the disclosure. No determination has been made, and no assertion is made, as to whether any of the above might be applicable as prior art with regard to the disclosure.

SUMMARY

The disclosure discloses a procedure necessary for a user equipment to provide continuity of an edge computing service to the user equipment.

The disclosure discloses a procedure necessary for a network node to provide continuity of an edge computing service to a user equipment.

The disclosure discloses a procedure necessary in an edge computing system to provide continuity of an edge computing service to a user equipment.

According to an embodiment of the disclosure, a method by a user equipment (UE) for maintaining a mobile edge computing (MEC) service in a mobile communication system includes: receiving, from an access and mobility management function (AMF) in the mobile communication system, a protocol data unit (PDU) session modification command including first information instructing modification of a PUD session for the MEC service and valid time of the PDU session; transmitting, to the AMF, a PDU session modification command NACK message including second information indicating a wait until transmission of an ACK, when relocation of an application context corresponding to the PDU session is possible within the valid time of the PDU session; transmitting, to an MEC system providing the service, an application context relocation request message; and transmitting, to the AMF, a PDU session modification command ACK in response to receiving an application context relocation complete message from the MEC system, wherein the PDU session modification command and the PDU session modification command NACK message are non-access-stratum (NAS) messages.

According to an embodiment of the disclosure, a user equipment (UE) for maintaining a mobile edge computing (MEC) service in a mobile communication system includes: a modem configured to communicate with the mobile communication system and an MEC system; an application client configured to process data received from the MEC system; and an edge enabler client (EEC), wherein the EEC receives, from an access and mobility management function (AMF) in the mobile communication system, a protocol data unit (PDU) session modification command including first information instructing modification of a PUD session for the MEC service and valid time of the PDU session through the modem, controls the modem to transmit, to the AMF, a PDU session modification command NACK message including second information indicating a wait until transmission of an ACK, when relocation of an application context corresponding to the PDU session is possible within the valid time of the PDU session, controls the modem to transmit, to the MEC system providing the service, an application context relocation request message, and controls the modem to transmit, to the AMF, a PDU session modification command ACK in response to receiving an application context relocation complete message from the MEC system, and wherein the PDU session modification command and the PDU session modification command NACK message are non-access-stratum (NAS) messages.

According to the disclosure, it is possible to perform run time coordination between an application context information relocation operation for mobility support in an edge computing system and a user plane path management operation in a 3GPP network without a service level agreement between an edge computing server provider and a mobile communication network operator. In addition, an edge computing server does not need to subscribe to a user plane path change event notification to a 3GPP network function and may link a context information relocation operation between edge computing servers and a user plane path management operation of a 3GPP network without needing to reserve related resources. Accordingly, the disclosure may provide continuity of an edge computing service to a UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
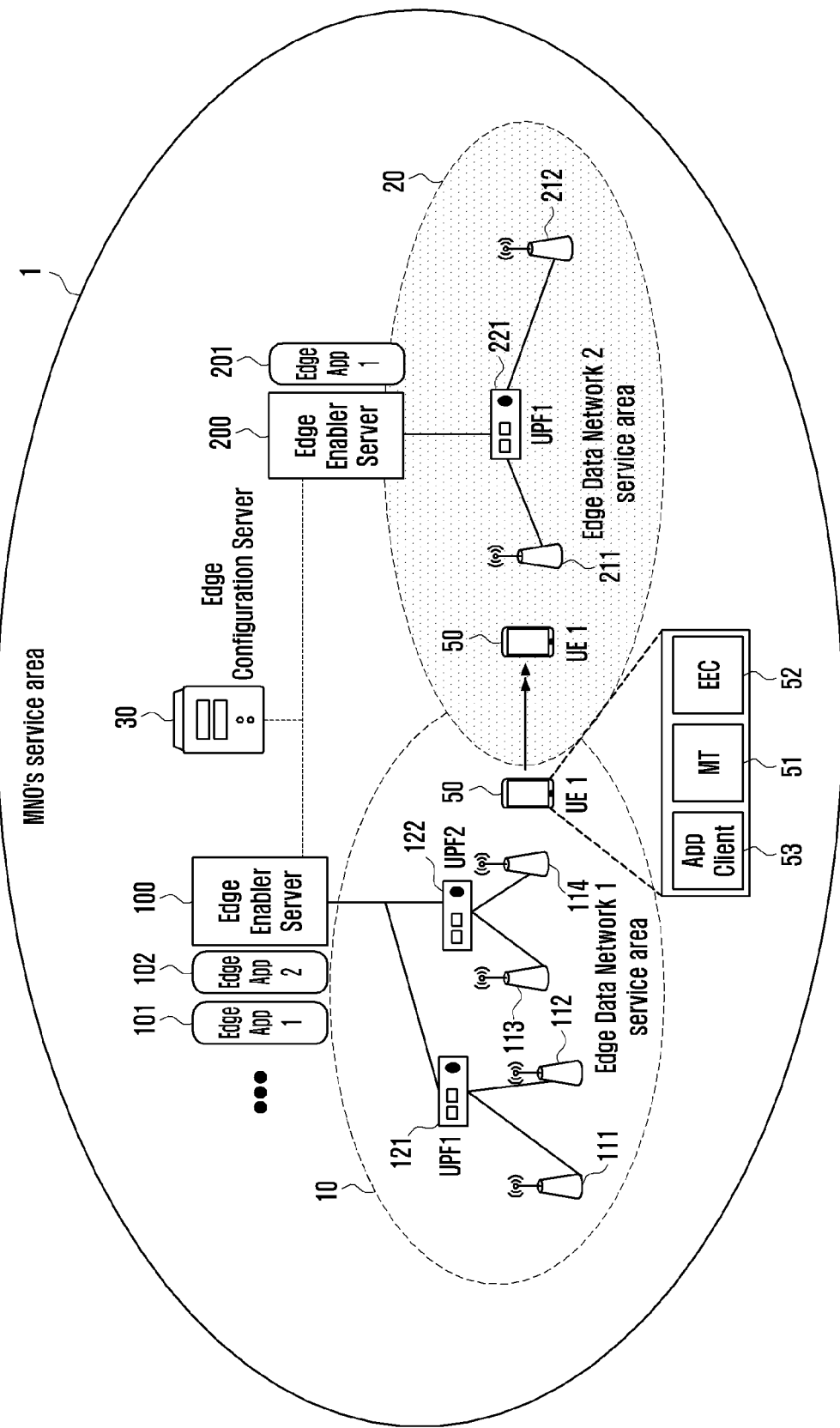
FIG. 1 is a view illustrating a connection between a 3GPP network and an edge computing system network and movement of a terminal according to various embodiments of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, principles of operating the disclosure will be described in detail with reference to the accompanying drawings. Terms used below are defined in view of functions in the disclosure and may thus be changed depending on a user, the intent of an operator, or the custom. Accordingly, the terms should be defined, based on the following overall description of this specification.

As used herein, terms referring to network entities, terms referring to entities of an edge computing system, terms referring to messages, terms referring to pieces of identification information, and the like are used for convenience of explanation. Therefore, the disclosure is not limited by the following terms, and other terms having equivalent technical meanings may be used.

Hereinafter, for convenience of explanation, terms and designations defined in 3GPP system standards are used in the disclosure. However, the disclosure is not limited by those terms and designations but may be equally applied to systems in accordance with other standards.

The disclosure described below relates to a communication system, in which a user terminal may establish a data connection to an edge data network at a location close to the location thereof in order to use a low-latency or broadband service. Further, disclosed is a technology for mobile edge computing that enables the user terminal to access an application server, for example, an edge application server, run in an edge hosting environment or an edge computing platform operated by an edge enabler server of the edge data network to use a data service. In particular, a technology related to communication between an edge computing system and a mobile network device for supporting mobility of the user terminal and procedures therefor will be described.

The disclosure provides an interworking method between an edge enabling layer related to mobility support and a NAS layer, which is a security layer of a mobile communication network.

The disclosure also provides a method of performing runtime coordination between an application function (EES/EAS) of an edge computing network and a specific node (SMF) of a mobile communication network through interworking between a terminal and the SMF.

In addition, the disclosure provides a method of providing information about user plane path management from an edge enabling layer to a mobile communication network, for example, a 3GPP network.

According to the disclosure, to perform run time coordination between an application context information relocation operation for mobility support in an edge computing system and a user plane path management operation in a 3GPP network, an edge computing server needs to directly interwork with the 3GPP network while serving as an application function. For this method, a service level agreement between an edge computing server provider and a network operator needs to be guaranteed in advance. Further, the edge computing server needs to always subscribe a user plane path change event notification to a mobile communication network, for example, a 3GPP network function. For this reason, the 3GPP network function and the edge computing server need to always reserve resources, causing overheads. To minimize reservation of resources and to reduce overheads for the edge computing server to directly interwork with the 3GPP network, the disclosure provides a method for terminal-based runtime coordination between the application context information relocation operation and the user plane path management operation.

FIG. 1 is a view illustrating a connection between a 3GPP network and an edge computing system network and movement of a terminal according to the disclosure.

FIG. 1 illustrates a service area 1 of a mobile network operator (MNO). The service area 1 of the mobile network operator may include edge data networks separated to provide an edge computing service to an electronic device. The respective edge data networks may include areas 10 and 20 for providing an edge computing service to an electronic device 1 (UE1) 50. For example, FIG. 1 shows an example in which a service area 10 of a first edge data network includes a first base station 111, a second base station 112, a third base station 113, and a fourth base station 114, and a service area 20 of a second edge data network includes a fifth base station 211 and a sixth base station 212.

As illustrated in FIG. 1, two different user plane function (UPF) devices 121 and 122 are included in the service area 10 of the first edge data network including the first base station 111 to the fourth base station 1114. In the following description, the UPFs 121 and 122 may be logically understood as one network device unless otherwise specified. Therefore, in the following description, the UPFs 121 and 122 will be referred to as a UPF device or a UPF. Further, as illustrated, the service area 20 of the second edge data network includes only one user plane function 1 (UPF1) 221. As illustrated in FIG. 1, one edge data network may include one or more UPFs.

The service area 10 of the first edge data network may be an area managed by one edge enabler server 100. The service area 20 of the second edge data network may be an area managed by another edge enabler server 200. In this manner, the service areas 10 and 20 of the edge data networks may be configured as areas that can be managed by the edge enabler servers 100 and 200. In another example, the service areas 10 and 20 of the edge data networks may be defined as areas of edge application servers connected to the edge enabler servers. In addition, as illustrated in FIG. 1, the service areas 10 and 20 of the edge data networks of a mobile communication system and an MEC system may be an area that enables a UE 50 to be served by at least one UPF (as indicated by reference numeral 20) or may be an area that enables the UE 50 to be served by two or more UPFs (as indicated by reference numeral 10). When associated with the mobile communication system, the service areas 10 and 20 of the edge data networks of the MEC system may be a single base station or a combination of two or more base station areas. Although FIG. 1 shows that a service area of an edge data network is not only one base station area, one base station area may be a service area of one edge data network if necessary.

As illustrated in FIG. 1, the edge enabler servers 100 and 200 may be connected to the same or different edge application servers 101, 102, and 201. First edge application servers 101 and 201 and a second edge application server 102 may provide different edge computing services, respectively. A first application server 201 located in the service area 20 of the second edge data network that provides the same service as a first edge application server 101 located in the service area 10 of the first edge data network may provide an edge computing service to the electronic device 50 through the different edge enabler servers 100 and 200. As illustrated in FIG. 1, the first edge application server 101 located in the service area 10 of the first edge data network may provide an edge computing service to the electronic device 50 connected to any one of the base stations 111, 112, 113, and 114 located in the first edge data network. The second edge application server 102 may provide an edge computing service to the electronic device 50 connected to any one of the base stations 111, 112, 113, and 114 located in the first edge data network.

The electronic device 50 may be a mobile terminal that can be provided with an edge computing service according to the disclosure and is capable of accessing a mobile communication network through a wireless network. The electronic device 50 may include a variety of mobile electronic devices, such as a smartphone, a tablet computer, a smartwatch, a game console, an automobile, a motorcycle, a bicycle, an airplane, and a ship, and/or various types of electronic devices capable of providing an IoT service. In a specific case, the electronic device 50 may be a device, such as a personal computer (PC). In this case, the personal computer needs to include a function of connecting to the mobile communication network. The electronic device 50 may have at least one edge computing service application 53 mounted according to the disclosure, may include an edge enabler client 52 according to the disclosure, and may include a mobile terminal 51, for example, a communication layer, to perform a wireless communication function. The communication layer of the mobile terminal 51 may include a communication processor or a modem. Therefore, the mobile terminal 51 may be interchangeably referred to as a communication processor or a modem hereinafter.

Mounting the edge computing service application may mean that the application for receiving an edge computing service may be installed (or stored) in a memory (not shown in the drawing) of the electronic device 50. Further, mounting the edge computing service application may mean that the application installed in the electronic device 50 is loaded into at least one processor to perform an operation for providing the edge computing service.

The edge enabler client 52 may be installed in the memory (not shown in the drawing) of the electronic device 50 in which the application for receiving the edge computing service is mounted. The edge enabler client 52 may be loaded into at least one processor instead of the installed application to perform at least part of an operation required by the edge computing service application.

The mobile terminal (MT) 51 may include a communication layer capable of communicating with a specific wireless communication network, for example, a 3GPP communication network, in a configured mode. The communication layer may include at least one communication processor and/or a modem, and may include a logic and at least one antenna for transmitting and receiving a wireless signal.

For convenience of explanation, the electronic device 50 is referred to as a user equipment (UE) hereinafter. Further, unless specifically limited, a terminal or a mobile terminal that is not designated by reference numeral 51 may be understood as an electronic device or a user equipment.

The base stations 111, 112, 113, 114, 211, and 212 have a predetermined area for communicating with the UE 50 in a wireless communication mode established with the UE. For example, when the established wireless communication mode uses a mode of a 3GPP mobile communication network, the base stations 111, 112, 113, 114, 211, and 212 may be base stations of the 3GPP mobile communication network.

The foregoing configuration of FIG. 1 illustrates an edge computing deployment and a case of interworking with a 5G network among mobile communication networks.

The user plane function (UPF) devices 121, 122, and 221 may serve as gateways transmitting a packet corresponding to user data transmitted or received by the UE. According to an embodiment of the disclosure, the UPFs 121, 122, and 221 may be located physically and/or logically close to the edge enabler servers 100 and 200 to support an edge computing service. By configuring the UPFs 121, 122, and 221 and the edge enabler servers 100 and 200 to be located physically and/or logically close to each other, a data packet to be provided to (or received from) a user may be transmitted directly to the edge data networks without passing through the Internet, thus reducing transmission. That is, low-delay transmission is possible. According to another embodiment of the disclosure, the UPFs 121, 122, and 221 may also be connected with the edge enabler servers 100 and 200 via a data network connected to the Internet.

According to an embodiment of the disclosure, an edge computing system may include the edge enabler servers 100 and 200, an edge configuration server 30, and the edge enabler client (EEC) 52. According to various embodiments of the disclosure, the edge enabler servers 100 and 200 may establish edge hosting environments 110 and 210 or edge computing platforms. Establishing an edge hosting environment or an edge computing platform means that an edge enabler server and at least one edge application server are connected or that at least one edge application server is running on a computing platform of an edge enabler server. Accordingly, the edge enabler servers 100 and 200 may know information about an edge application server running in the edge hosting environments or running on the edge computing platforms.

According to various embodiments of the disclosure, the edge enabler servers 100 and 200 may negotiate with the UE 50 and may connect an application client 53 running in the UE 50 and the edge application server in the edge hosting environments. According to various embodiments of the disclosure, as described above, the UE 50 supporting the edge computing system may have the edge enabler client 52 embedded or mounted therein. According to an embodiment of the disclosure, a negotiation between the UE 50 and the edge application server may be performed through interworking between the edge enabler client 52 in the UE 50 and the edge enabler servers 100 and 200. According to an embodiment of the disclosure, a layer in which interworking between the edge enabler client 52 and the edge enabler servers 100 and 200, such as the negotiation, is performed may be referred to as an edge enabling layer. The terminal or the UE 50 according to the disclosure may include an IoT device and a vehicle in addition to the aforementioned smartphone.

According to various embodiments of the disclosure, the edge configuration server 30 knows deployment information about the edge enabler servers 100 and 200 and may perform a function of transmitting configuration information for using an edge computing service to the UE 50. According to an embodiment of the disclosure, the configuration information may include at least one of edge data network connection information, an edge data network service area, and edge enabler server connection information. Instead of defining an edge data network separately, a local data network in which the edge enabler servers and the edge application server exist may be considered to correspond to an edge data network. The edge configuration server may be referred to as an edge configuration server (ECS) 30.

According to various embodiments of the disclosure, the edge data network connection information may include, for example, a data network name, single-network slice selection assistance information (S-NSSAI), or the like. Here, a network slice means that a device (or server) performing a specific function in a core network may be configured in the form of a slice. For example, a UPF may be configured with one server or network device. In another example, one server or network device may include two or more UPF slices therein. In yet another example, a UPF may be configured with two or more servers or may be configured with two or more network devices. A specific network slice may be logically understood as a network device that performs one specific function.

According to various embodiments of the disclosure, the edge data network service area (region) may include, for example, at least one or two or more cell lists, a tracking area list, and a network identifier (PLMN ID) of an operator. Further, the edge data network service area (region) may be a service area (region) of an edge enabler server configured by the edge enabler server in an edge data network. Alternatively, in an edge data network deployment scenario using a local access data network (LADN), the edge data network area (e.g., region) may be the same as an LADN service area. That is, the UE 50 may receive information about an edge enabler server connectable at a specific location from the edge configuration server 30. When the edge configuration server 30 can know information about an edge application server running in an edge hosting environment of a specific edge enabler server, the edge enabler client 52 in the UE 50 may obtain the information from the edge configuration server 30. According to various embodiments of the disclosure, the edge enabler server connection information may be, for example, a uniform resource identifier (URI) or an endpoint address, such as an Internet Protocol (IP) address.

According to various embodiments of the disclosure, the UE 50 may obtain information about a connectable edge enabler server based on specific location information, for example, a specific base station, a specific data network, or a specific physical location, from the edge configuration server 30. According to an embodiment of the disclosure, when the edge configuration server 30 can know information about an edge application server running in an edge hosting environment of a specific edge enabler server, the UE 50 may also obtain the information through the edge enabler client 52.

According to various embodiments of the disclosure, the edge application servers 101, 102, and 201 may refer to third-party application servers running in the edge computing system. According to an embodiment of the disclosure, the edge application servers 101, 102, and 201 may be third-party application servers running on an infrastructure provided by an edge hosting environment, and can provide a service at a location close to the UE 50, thus providing a low-latency service. According to various embodiments of the disclosure, information about an upper layer of a service provided from an edge application server to the UE 50 may be referred to as an application context. For example, when a user uses a real-time game application, all pieces of information necessary to regenerate a screen and a play phase currently viewed by the user in the game may be included in the application context. For example, for the UE 50 to connect to another edge application server and to use an existing service without interruption, the application context needs to be relocated in the edge application server to be newly connected. In order to perform application context relocation, an edge application server capable of providing a service to an application running in the application client 53 of the UE 50 needs to be available. Availability of the edge application server in the edge data network may be determined according to whether the edge application server runs in the edge hosting environment and the state of the edge application server.

The edge enabler servers 100 and 200, the edge application servers 101, 102, and 201, and the edge configuration server 30 in the edge computing system may obtain terminal-related information from the mobile communication system. In a specific example, the 3GPP system may include a network exposure function (NEF) device that is a network entity exposing a network function. In this case, at least one entity among entities forming the edge computing system may include an application program interface (API). The entity of the edge computing system including the API may obtain the terminal-related information using the API.

According to various embodiments of the disclosure, as described above, the UE 50 may include the application client 53, the edge enabler client 52 that connects the application client 53 and an edge computing service, and the mobile terminal (MT) 51 connecting to the mobile communication system. According to various embodiments of the disclosure, an application of the UE 50 is an application provided by a third party and may refer to a client application program that is run in the UE 50 for a specific application service. Two or more applications may run in the UE 50. According to an embodiment of the disclosure, at least one of the applications may use a multi-access edge computing (MEC) service. The edge enabler client 52 in the UE 50 may refer to a client that performs an operation in the UE 50 necessary to use an edge computing service. According to an embodiment of the disclosure, the edge enabler client 52 may identify which application can use the edge computing service and may perform an operation of connecting a network interface so that data of the application client of the UE 50 can be transmitted to an edge application server that provides the edge computing service. According to an embodiment of the disclosure, the UE 50 may configure a wireless channel with a base station through the mobile terminal 51 to use the edge computing service. The wireless channel may be configured in a communication layer, for example, a 3GPP communication layer, of the mobile terminal 51. According to an embodiment of the disclosure, the communication layer of the mobile terminal 51 may serve to establish a wireless connection for data communication, to register the UE 50 in the mobile communication system, to establish a connection for data transmission to the mobile communication system, and to transmit or receive data.

Network functions (NFs) running in the 3GPP network illustrated in FIG. 1 or to be described below will be described as "devices." However, each NF may be actually configured in the form of an instance in one physical server.

In the disclosure, one instance may be configured as specific software, and the software performing one instance operation may be configured to run on one physical hardware device.

According to another embodiment of the disclosure, one instance may run in two or more hardware devices, for example, different racks forming two or more servers or one server, rather than in one physical hardware device.

According to yet another embodiment of the disclosure, two or more different instances may run on one physical hardware device, for example, one server. In this case, at least some of the NFs illustrated in FIG. 1 may run in the same physical hardware.

According to yet another embodiment of the disclosure, two or more instances performing the same function may run in one physical hardware device. When two or more instances performing the same function run in one physical hardware device, the respective instances may control and/or serve different objects, for example, different UEs. When one instance performs a specific operation of controlling the same object, for example, the same single UE, and/or providing a service to the same object, the same single UE may have different identifiers for different services and/or controls.

In the following description, one NF will be described as one device only for convenience of explanation. However, as described above, each NF may be configured as one instance or two or more instances, and all of these cases may be included herein. Further, other NFs not described above will be described as devices in accordance with the foregoing description. However, each NF may be actually configured as one instance or two or more instances.

Figure 2:
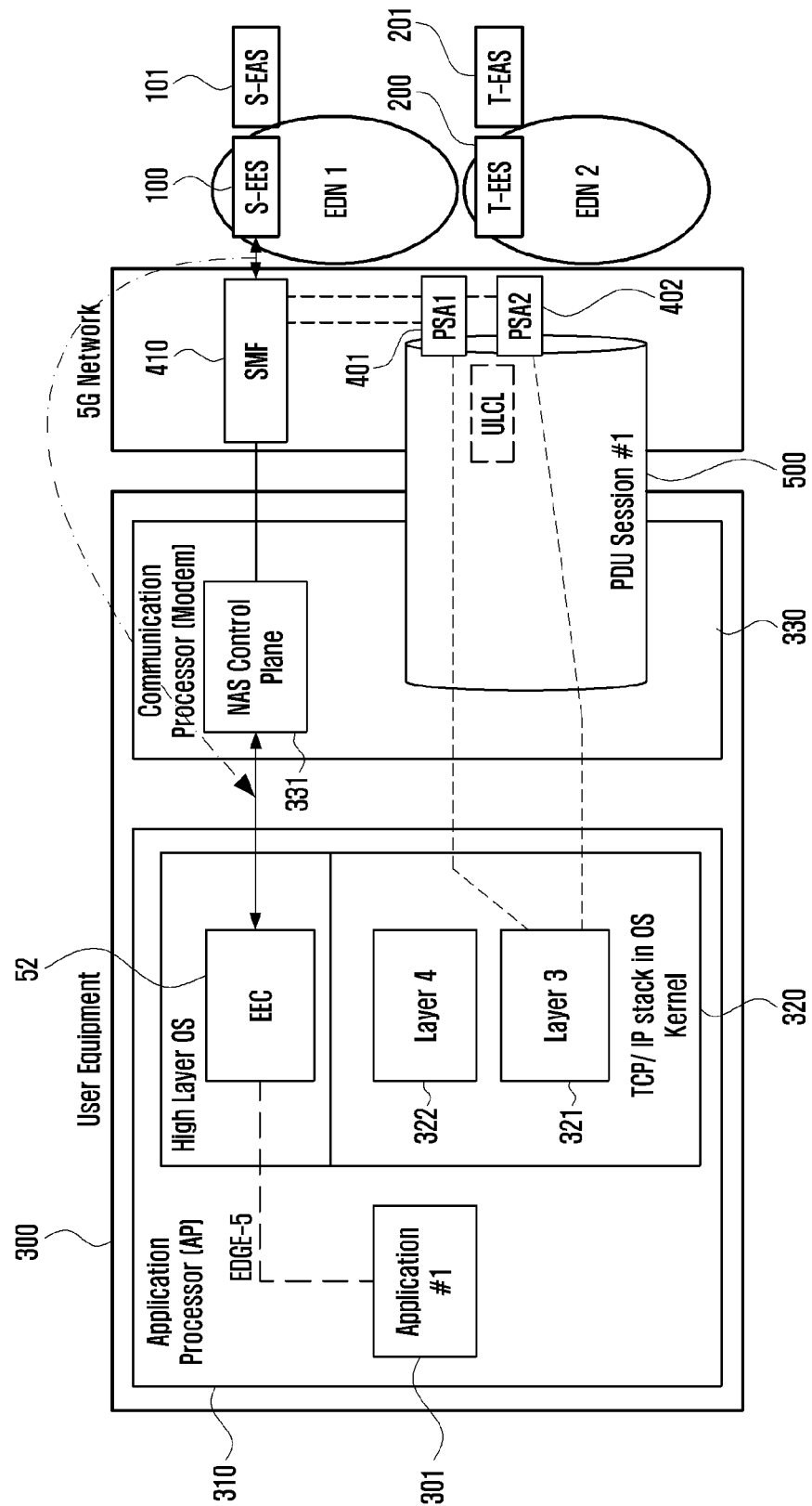
FIG. 2 is a structural diagram illustrating interworking of a mobile communication network, an edge computing network, and an edge enabling layer according to various embodiments of the disclosure.

FIG. 2 is a structural diagram illustrating interworking of a mobile communication network, an edge computing network, and an edge enabling layer according to various embodiments of the disclosure.

First, for convenience of explanation, a UE is designated by reference numeral 300 in the following description. However, the UE may be the same UE designated by reference numeral 50 described in FIG. 1. In the internal block configuration of the UE 300 illustrated in FIG. 2, only components for explaining interworking of the edge enabling layer are illustrated. Accordingly, it will be apparent to those skilled in the art that the UE 300 may have components other than the components illustrated in FIG. 2. For example, the UE 300 may include an antenna for connecting to a mobile communication network and/or a wireless communication network and at least one RF module. The UE 300 may further include a memory, and may additionally include an input device and an output device for interfacing with a user.

Referring to FIG. 2, the UE 300 may include an application processor 310 and a communication processor 330. The communication processor 330 may include a non-access-stratum (NAS) control plane 331 therein. A NAS control plane operation may include a series of procedures required for the UE 300 to initially connect to the mobile communication network, to perform an authentication procedure, to generate a PDU session, to connect to a data network, and to exchange user plane data. For example, the NAS control plane operation includes an operation of receiving a signaling message (e.g., a PDU session modification command) related to occurrence of an event related to a user plane path from a network device (e.g., a session management function) that manages a PDU session and transmitting a necessary response message (e.g., a PDU session modification command ACK). Alternatively, the UE 300 may transmit signaling to a specific node or device of the network through the NAS control plane in order to request PDU session generation. The communication processor 330 may configure a first PDU session 500 with the mobile communication network, for example, a 5G network 400. The first PDU session 500 may be connected to a first PDU session anchor (PSA1) 401 and a second PDU session anchor (PSA2) 402. When there are two or more PDU session anchors for one PDU session, a PDU session anchor may be changed in the mobile communication network due to movement of the UE 300.

A first application (Application #1) 301 for receiving an edge computing service may be mounted in the application processor 310 of the UE 300. The first application 301 being mounted may mean a state in which a program is stored in a memory in the UE 300 and the first application can run on an operating system (OS).

The application processor 310 of the UE 300 may include a TCP/IP stack 320 in an OS kernel. The TCP/IP stack 320 may include a third layer (Layer 3) 321 and a fourth layer (Layer 4) 322 and may include an edge enabler client 52 thereabove. The edge enabler client 52 employs the same reference numeral as that described in FIG. 1 in view of a correspondence therebetween. The third layer 321 may perform an operation necessary to enable an application client 53 and an edge application server (EAS) to communicate using an Internet protocol. Additionally, in the disclosure, the third layer 321 may serve to receive a router advertisement (RA) message including IP address configuration information and to determine and report the meaning of the information included in the RA message to an upper layer. The fourth layer 322 may perform an operation necessary to reliably and efficiently transmit data generated from the application client 53 to the edge application server. The application client 53 may be the first application (Application #1) 301.

Next, edge data networks may include two or more different edge data networks. FIG. 2 illustrates two different edge data networks EDN 1 and EDN 2. A first edge data network EDN 1 is shown to include the first edge enabler server 100 and the first edge application server 101 described with reference to FIG. 1. Here, as described above in FIG. 1, since the UE 300 can move to a second edge data network EDN 2, the edge enabler server 100 and the edge application server 101 of the first edge data network EDN 1 are marked with "source," and an edge enabler server 200 and an edge application server 201 included in the second edge data network EDN 2 are marked with "target."

As illustrated in FIG. 2, a 3GPP network 400 provides a user plane (UP) path management event notification application program interface (API) that an EAS or an EES can use. When a UP path management event (e.g., a change of a PDU session anchor user plane function (PSA UPF)) occurs due to movement of the UE 300, the occurrence of the event may be notified to the EESs 100 and 200 or the EASs 101 and 201 outside the 3GPP network 400 through the API. To support this operation, a service level agreement is required between a provider of the EESs 100 and 200 or the EASs 101 and 201 that desire to receive a notification and a network operator and it is necessary to identify availability of the API in advance and to subscribe to a notification service.

Without the EESs 100 and 200 or the EASs 101 and 201 using the API provided by the 3GPP network 400 as illustrated in FIG. 2, the same function may be provided through an operation in the UE 300. It is possible to detect occurrence of a UP path management through interworking of the edge enabler client (EEC) 52 of an edge enabling layer in the UE 300 and the NAS layer control plane 331 of the communication processor 330, for example, a modem, and to perform an operation required by each of the edge enabling layer and a NAS layer.

Each network function (NF) described herein may run in a specific server or may be configured as one separate independent device. When an NF is configured in one server, two or more NFs may be configured in one server. When two or more NFs are configured in one server, two or more identical NFs may exist in one server. In this case, the NFs may be one method for configuring a network slice. When one NF or two or more NFs are configured in one server, a program for performing operations of the NFs may be mounted in the server. Further, one NF may be configured to run on two or more interworking servers.

Figure 3:
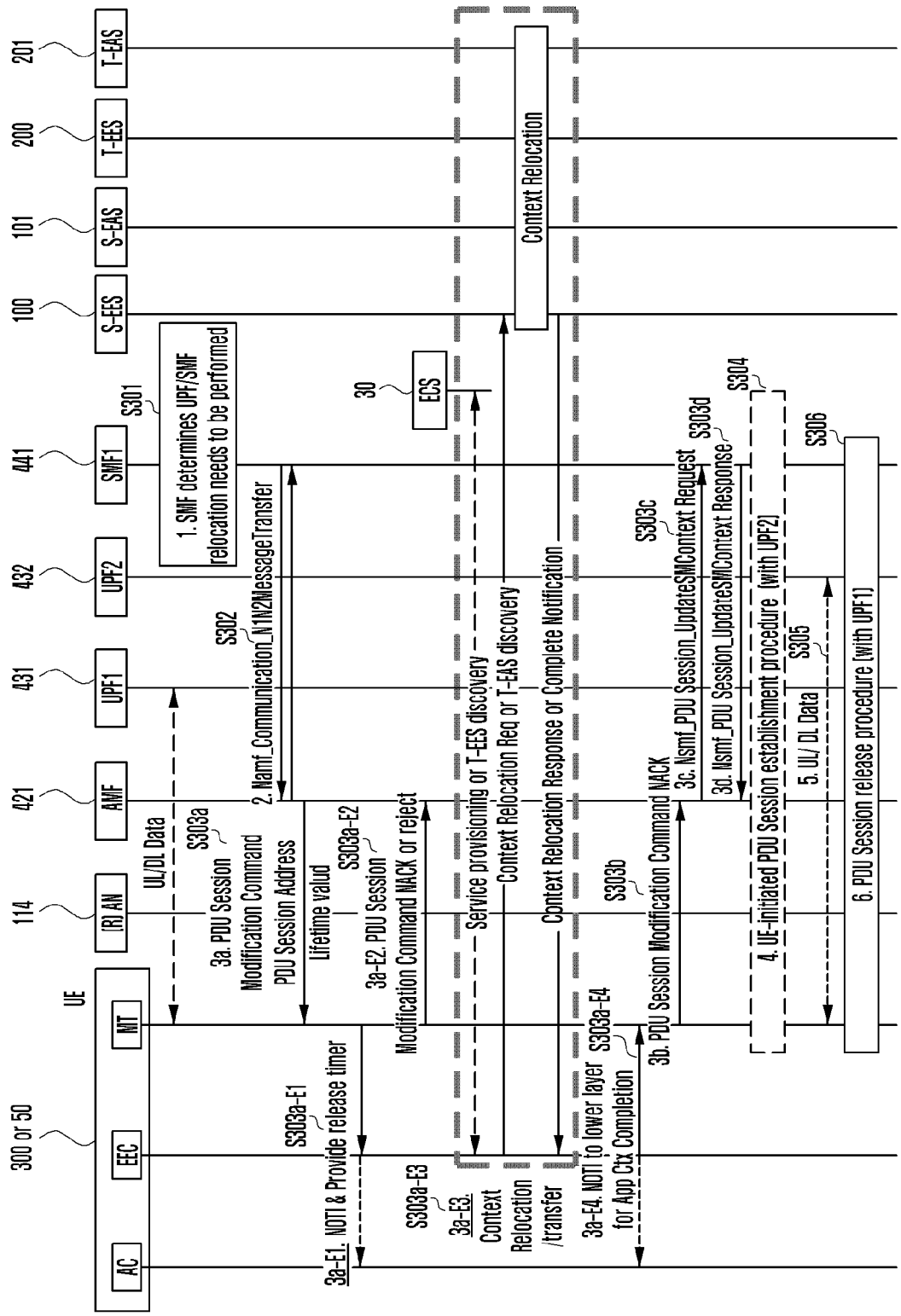
FIG. 3 illustrates a signal flowchart for providing continuity of an edge computing service based on movement of a UE according to various embodiments of the disclosure.

FIG. 3 illustrates a signal flowchart for providing continuity of an edge computing service based on movement of a UE according to various embodiments of the disclosure.

Referring to FIG. 3, in operation S301 (Step 1), a session management function (SMF)1 441 may determine that user plane function (UPF) and/or SMF relocation needs to be performed based on movement of the UE.

In operation S302 (Step 2), the SMF 441 may invoke and transmit a Namf_Communication_N1N2MessageTransfer message to an access and mobility management function (AMF) 421. The message may include a PDU session ID, an SMF Reallocation requested indication, and an N1 SM container (PDU session modification command (cause, PDU session address lifetime, and UE upper layer coordination requested indication)). Here, the SMF1 441 may configure and operate a PDU session release timer according to a PDU session address lifetime value.

The configured value of the timer may be configured using a value provided from an edge enabler server 100 or 200 or an edge application server 101 or 201 or using a value provided from the UE 300 (e.g., the edge enabler client 52). In another method, when configuring the PDU session release timer, the SMF1 441 may determine whether to configure the value of the timer to be greater than a normal value based on a local configuration instead of being provided with the value from the edge enabler server 100 or 200 or the edge application server 101 or 201 depending on whether the relocation is performed. It is possible to determine and reconfigure whether to perform the relocation by the UE 300 transmitting a relevant indication to the SMF1 441 (via an ACK of the PDU session modification command, a relevant operation of which will be described in detail with reference to Step 3b) or depending on an application to which a corresponding session is bound. Information included in the Namf_Communication_N1N2MessageTransfer message transmitted from the SMF 441 to the AMF 421 is described in detail as follows.

An SMF Reallocation requested indication: whether SMF Reallocation is requested. This indication may be used for the AMF 421 to determine whether to perform an operation related to SMF relocation.

A PDU session modification command (cause in PDU session modification command): information for instructing the UE 300 to modify a PDU session, which is included in the N1 SM container and may be transmitted to the UE 300. PDU session re-establishment to the same DN is required.

A UE upper layer coordination requested indication: when a PDU session corresponding to the PDU session ID is connected to an edge data network (EDN), an indication of reporting this information and of possibly requiring interworking with the upper layer (edge enabling layer) may be included and transmitted in the N1 SM container. Instead of separately configuring this indication, it is possible to include and transmit the information in a cause parameter of the PDU session modification command. For example, information about whether support for edge application server or edge enabler server relocation can occur may be included in the cause parameter.

In operation S303a (Step 3a), the AMF 421 may transmit the PDU session modification command to the UE 300 using the NAS message (N1 SM container) received from the SMF1 441.

In operation S303a-E1, the UE 300 may perform the following operations instead of immediately transmitting a response to the received NAS message.

A communication processor (e.g., a modem 51) 330 of the UE 300 may transmit a release timer value or a PDU session address lifetime value included in the NAS message to an EEC 52 in the UE 300.

The EEC 52 may check (identify or determine) whether application context transfer (relocation/migration) can be performed before the timer expires and may transmit a negative response to the modem 51.

The EEC 52 may provide the timer to the S-EES 100, the S-EAS 101, the T-EES 200, or the T-EAS 201 so that the application context relocation is completed before the timer expires. Upon receiving the timer, the edge computing servers may determine (identify or judge) whether a required operation can be completed before the timer expires and may then transmit a negative response to the EEC 52. Upon receiving the negative response, the EEC 52 may report the negative response to the modem 51 or 330, and the modem 51 or 330 may request the SMF1 441 to delay a UP path management operation. Here, as described above, the modem 51 or 330 may be interchangeably used with the communication processor or a mobile terminal (MT), all of which may refer to a processor capable of communication with a mobile communication network or a wireless communication network. Therefore, component designated by at least one of reference numeral 51 or 300 should be equally interpreted.

If necessary, the EEC 52 may also transmit the corresponding value and information about whether a UP path change event occurs to an associated application client (AC) 53 or 301 through an EDGE-5 interface. Here, the application client 53 or 301 may be an application receiving an MEC service and may employ either or both of the above reference numerals.

In addition, the following pieces of information may be provided from the modem 330 to an upper layer (edge enabling layer, EEC, AC, and the like) in the UE 300.

Information indicating that application context relocation (ACR) is required may be transmitted from the modem 51 to the EEC 52 and the application client 53 (to the application client 53 via the EEC 52 (EDGE-5)).

Timer for transmitting PDU session modification command ACK: When the timer expires, a lower layer (e.g., the modem) may transmit, to the EEC 52, an indication that a PDU session modification command ACK is transmitted to the SMF1 441.

As described above, after transmitting the necessary information to the EEC 52 of the upper layer, the modem 330 may configure a PDU session modification command response transmission timer value and may operate a transmission timer. Operating the transmission timer is for transmitting a response to a 3GPP network without waiting too long when there is no response from the upper layer. The PDU session modification command response transmission timer value may be configured based on the PDU session address lifetime value received from the network.

In operation S303a-E2, the modem 51 of the UE 300 may transmit a NAS message relating to PDU session modification command NACK or rejection to the SMF1 441 (here, the message may be transmitted through the AMF 421). The following pieces of information may be included in the PDU session modification command NACK or rejection message.

(1) Information indicating waiting until transmission of an ACK may be included in the cause.

This is for reporting that a PDU session modification command ACK may be transmitted later. This information may be used as an indication of a request of the SMF1 441 to wait for UPF configuration or activation until the transmission of the ACK.

(2) Preferred (or suggested) timer for PDU session release that may be determined by the modem 51 based on a PDU session release timer value suggested by the UE 300 or information provided from the EEC 52 or the application client 53 and may be included in the response to the PDU session modification command.

(3) Indication that the SMF is not to be changed: the indication may include indication information about a request to continue to use the SMF previously associated with the UE 300.

For reference, although a negative response (NACK) or a rejection message may be transmitted in response to the PDU session modification command in operation S303a-E2 as described above, the same operation (requesting a UPF configuration or activation delay or transmitting a suggested timer value) may be performed to the SMF1 441 while transmitting a positive response (ACK) and transmitting the same parameter as above.

In operation S303*a*-E3, the EEC 52 needs to enable context relocation in the S-EAS or the S-EES to be completed before transmitting a PDU session modification command ACK from the UE 300 or performing a UE-initiated PDU session establishment request with a new UPF.

(1) The EEC 52 receiving a notification from the modem 51 may check (identify or determine) whether there is information that needs to be relocated to ensure service continuity, such as application context information or transport layer context information stored in the S-EAS 101, the S-EES 100, or the application client 53, and whether relocation is necessary/possible. To this end, the EEC 52 may identify and determine (judge) an EAS service continuity support attribute in an EAS profile or may identify application client profile information.

As a result of the identification, when context relocation or transfer is not required, the EEC 52 may immediately notify the modem 330 that the context relocation or transfer is not required, thereby transmitting a response to the SMF1 441 so that UP path configuration/activation may be immediately performed (perform Step 3b). For example, the EEC 52 may transmit context relocation un-required indication information to the modem so that the modem 51 may immediately transmit a response (PDU session modification command ACK or PDU session modification command complete) to the PDU session modification command to the SMF1 441 via a NAS message.

As a result of the identification, when the context relocation or transfer is required, the EEC 52 may interwork with an edge configuration server (ECS) 30 to be provided with new T-EES information as necessary or may utilize information previously stored in the EEC 52. The EEC 52 may perform a T-EAS discovery procedure based on available T-EES information. The EEC 52 may perform a T-EES discovery and may then transmit a context relocation request message including obtained T-EAS information to the S-EES 100 or may request the S-EES 100 to perform a T-EES discovery without performing a T-EAS discovery procedure in advance. As a result of this procedure, the S-EES 100 may notify the S-EAS 101 and the T-EAS 201 that context information corresponding to the UE 300 needs to be relocated. Further, the S-EES 100 may give a command (or control or instruction) to perform T-EAS context relocation from the S-EAS 101. As necessary, context information stored in the S-EES 100 may also be relocated to the T-EES 200. After relocation of context information stored in the S-EAS 100 and the T-EES 200 is completed, the S-EES 100 may notify the EEC 52 that the relocation is completed (context relocation response or context relocation complete notification).

In operation S303*a*-E4, the application client 53 in the UE may transmit a context relocation complete notification to the lower layer.

When recognizing that the relocation is completed by receiving the context relocation response or the context relocation complete notification, the EEC 52 (the completion of the relocation may be notified to the application client 53 depending on application client 53 and EAS configuration methods and accordingly the EEC 52 may be notified of the completion of the relocation from the application client 53) may perform an operation of notifying the modem 51 that the relocation is completed.

The EEC 52 may transmit a notification of the completion of the relocation to the lower layer (e.g., the modem 51) and the application client 53 in the UE 300.

In operation S303*b*, the modem may be notified of the completion of the relocation from the EEC 52 and may transmit a NAS message (PDU session modification command ACK) to the AMF 421. The modem 51 may transmit the PDU session modification command ACK when receiving the notification of the completion of the relocation from the EEC 52 or when the timer configured in operation S303*a*-E1 expires. The NAS message may be transmitted from the modem 51 of the UE 300 to the AMF 421.

In operation S303*c*, the AMF 421 may transmit the NAS message, received from the UE 300, to the SMF1 441.

In operation S303*d*, the SMF1 441 may transmit a response to the message received from the AMF 421 to the AMF 421.

When the NAS message received from the UE 300 through the AMF 421 includes the fact that the relocation has been completed or there is no negative response, the SMF1 441 may prepare to perform an operation of performing activation (new UPF activation) of a new user plane path in which the configuration is performed. Further, the SMF 441 may wait to receive a PDU session release request message from the UE 300 without waiting until the PDU session release timer expires. When the PDU session release timer expires, an old PSA UPF (e.g., 431) may immediately release a resource for the UE 300.

When the negative response of the UE 300 is included in the NAS message, the SMF1 441 may stop the PDU session release timer and may maintain an existing user plane path rather than releasing the same.

In operation S304, when being notified the completion of the relocation from the EEC 53 and completely transmitting the PDU session modification command ACK to the SMF1 441, the modem 51 of the UE 300 may perform a UE-initiated PDU session establishment request to configure a new user plane path to the T-EAS 201 and the T-EES 200. Here, a new SMF may be selected and a UPF2 432 may be configured and activated.

In operation S305, the UE 300 may continue communication between the T-EAS 201 and the application client through the newly configured/activated user plane path.

In operation S306, after identifying that the communication between the application client 53 and the T-EAS 201 is successfully performed and that data is successfully transmitted and received via an uplink and a downlink, the UE 300 may perform a procedure for PDU session release from the previous UPF1 (431).

Figure 4:
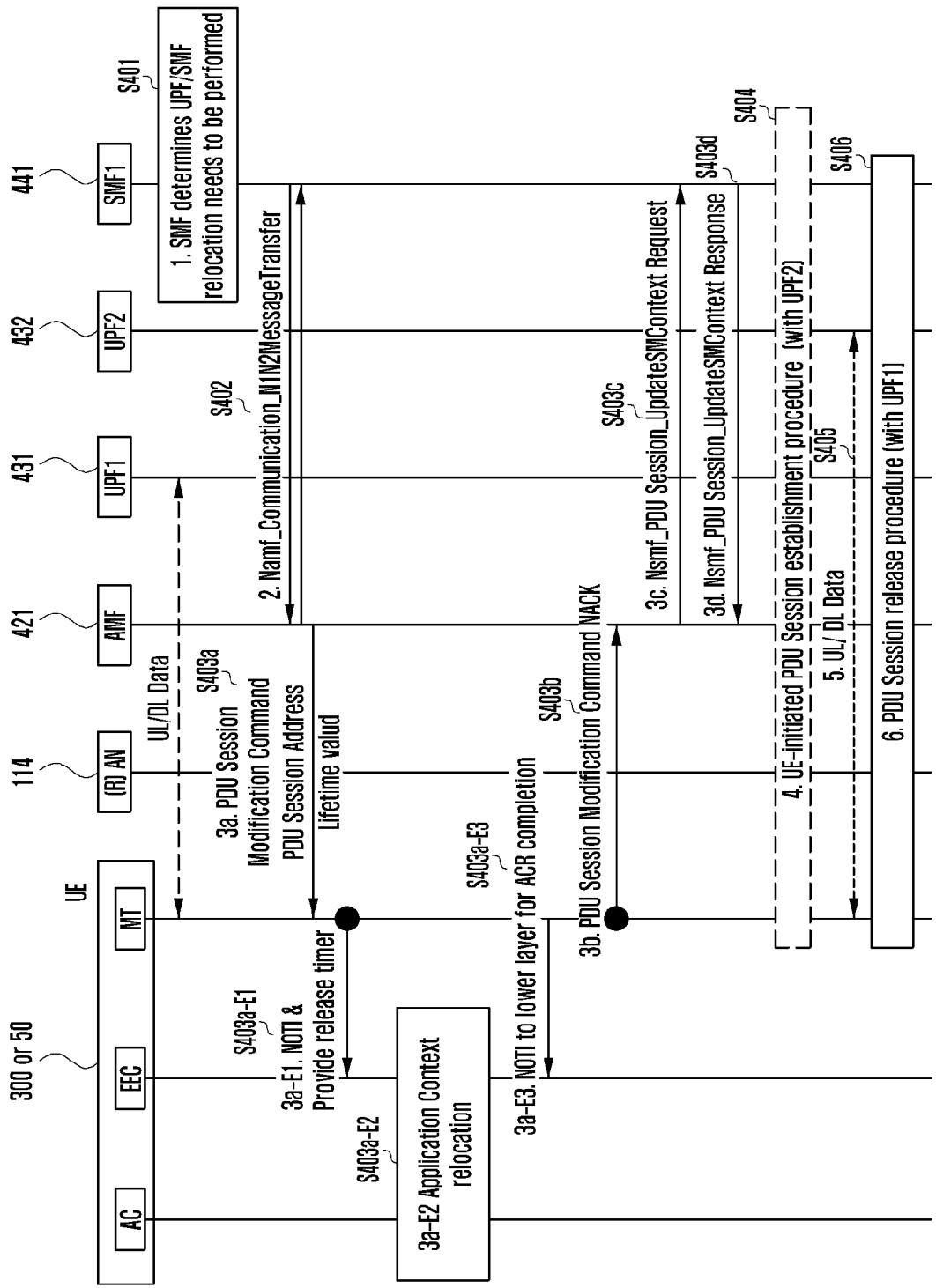
FIG. 4 illustrates a signal flowchart for providing continuity of an edge computing service based on movement of a UE according to various embodiments of the disclosure.

FIG. 4 illustrates a signal flowchart for providing continuity of an edge computing service based on movement of a UE according to various embodiments of the disclosure.

Respective operations S401, S402, S403*a*, and S403*a*-E1 are performed respectively in the same manner as operations S301, S302, S303*a*, and S303*a*-E1 described above aforementioned embodiment of FIG. 3. Therefore, a redundant description will be omitted.

In operation S403*a*-E2, upon receiving a PDU session modification command and related information from a modem 51, an EEC 52 may instruct (notify or request) an application client (edge-aware application) 53 to perform application context relocation. If necessary, before transmitting the instruction to perform the application context relocation, the EEC 52 performs a service provisioning operation (obtaining T-EES information from an ECS 30) and a T-EAS discovery operation with respect to a T-EES (e.g., the T-EES 200 described in FIG. 1 to FIG. 3) obtained from the ECS 30. Here, the T-EAS discovery operation with respect to the T-EES 200 may be an operation of the EEC 52 requesting (instructing) the T-EAS discovery operation from the T-EES 200 and an operation of receiving a response thereto. For example, a T-EAS 201 may not exist in the T-EES 200 or may be in an inactive state. In this case, when receiving a T-EAS discovery request (instruction) from the EEC 52, the T-EES 200 may activate the T-EAS 201 in response or may provide a response that there is no T-EAS. In another example, there may be a case where the T-EAS 201 is activated in the T-EES 200 but cannot accommodate a service anymore. In this case, the T-EES 200 may activate a new T-EAS 201 as a response or may transmit a response message of being impossible to accommodate (including rejection). In the following description, it is assumed that the EEC 52 receives a positive response to the discovery of the T-EAS 201 from the T-EES 200, receives a response that the T-EAS 201 exists, or receives a response that the T-EAS 201 can accommodate a service.

The EEC 52 may transmit T-EAS address information or the like obtained through the T-EAS discovery operation to the application client 53. Upon receiving this information, the application client 53 may provide information about an S-EAS (e.g., the S-EAS 201 described in FIG. 1 to FIG. 3) to the T-EAS 201 through the T-EAS address information and may request application context retrieval. After receiving the request, the T-EAS 201 may receive application context from the S-EAS 101 and may then notify the application client 53 of completion of context relocation, and the application client 53 may transmit this fact to the EEC 52. Although FIG. 4 illustrates only operations performed between the AC 53 and the EEC 52 among the foregoing operations, all or at least part of the foregoing operations may be included.

In operation S403a-E3, the EEC 53 may notify the modem 51 of the completion of the application context relocation. The modem 51 waits without transmitting a PDU session modification command ACK until being notified of the completion of the application context relocation.

The modem 51 may be notified of the completion of the application context relocation and may perform operation S403b. Operations, for example, operation S403c, operation 403d, and operation S404 to operation S406, following operation S403b are also those of FIG. 3 described above. The operation may be the same as operation S303c, operation 303d, and operation S304 to operation S306 of FIG. 3 described above. Since these operations are performed in the same procedure as described above, a redundant description will be omitted. Through the above operations, UP path management for the UE 300 may be completed.

Figure 5:
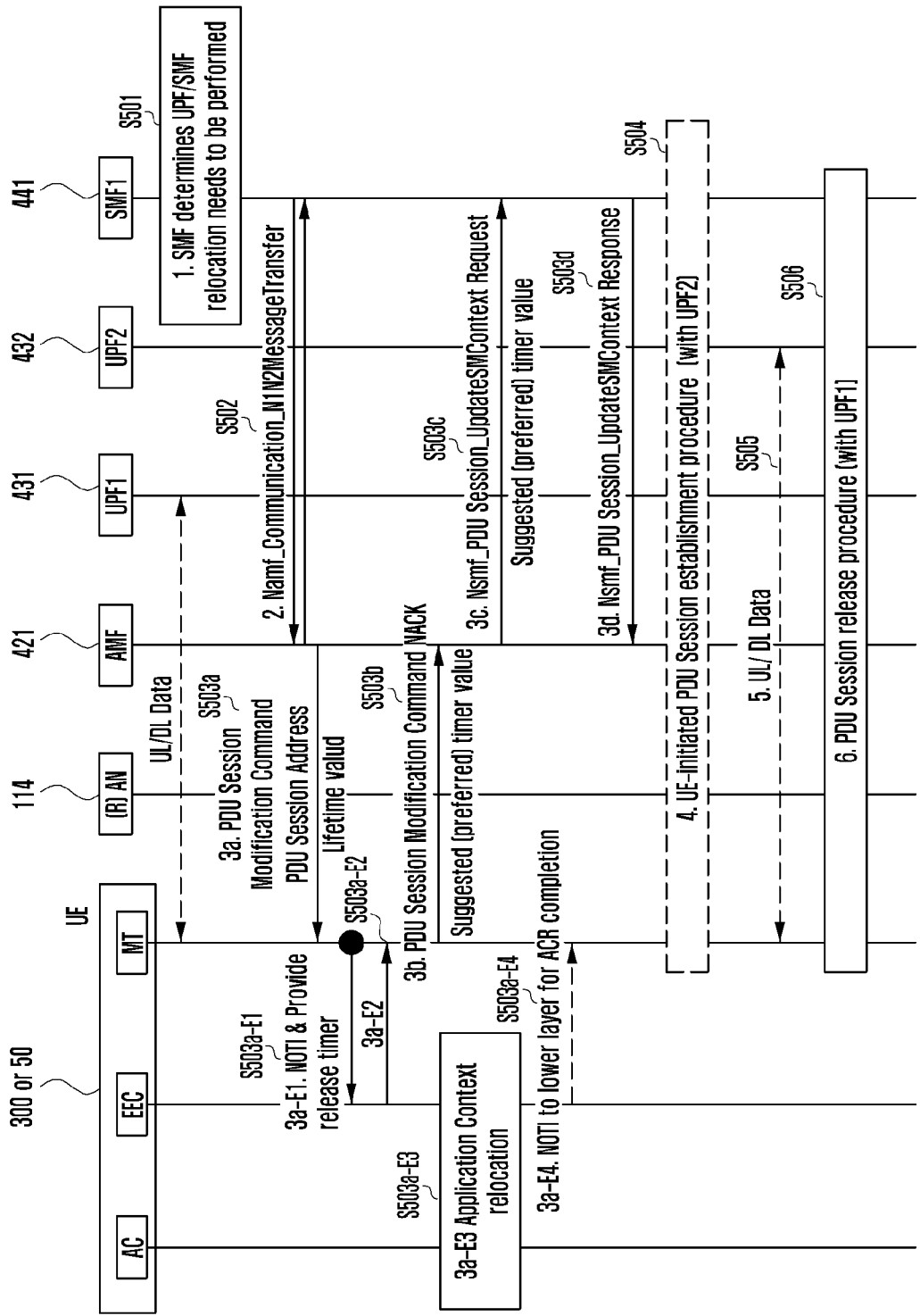
FIG. 5 illustrates a signal flowchart for providing continuity of an edge computing service based on movement of a UE according to various embodiments of the disclosure.

FIG. 5 illustrates a signal flowchart for providing continuity of an edge computing service based on movement of a UE according to various embodiments of the disclosure.

Respective operations S501, S502, S503a, and S503a-E1 are performed in the same manner as operations S301, S302, S303a, and S303a-E1 described above aforementioned embodiment of FIG. 3. Therefore, a redundant description will be omitted.

In operation S503a-E2, an EEC 52 may immediately transmit a response to a notification from a modem 51 and may provide a PDU session address lifetime value. For example, when the EEC 52 determines that an application context relocation operation needs to be performed, the EEC 52 may request update of a PDU session release timer while providing a timer value greater than a PDU session address life timer value of an SMF1 441 to the modem 51.

After receiving (or in response to receiving) a PDU session modification command message in previous operation S503a, the modem 51 may configure a suggested (preferred) timer value in a PDU session modification command ACK message and may immediately transmit the message to the SMF1 441 through an AMF 421 in response to the NAS message in operation S503b. Upon receiving the message, the AMF 421 may transmit the NAS message received from the modem 51 of the UE 300 to the SMF1 441 in operation S503c.

In operation S503a-E3, the EEC 52 may notify (or instruct, direct, or transmit) an application client 53 that application context relocation is necessary and may perform a related procedure simultaneously with or after previous operation S503a-E2. For example, the EEC 52 may sequentially perform service provisioning and EAS discovery operations or may transmit a context relocation request message to an S-EES (e.g., the S-EES 100 described in FIG. 1 to FIG. 3). Although FIG. 5 illustrates only operations performed in the UE 300, the foregoing operations may be performed together, previously, or subsequently.

In operation S503a-E4, after an application context relocation procedure is completed (a notification of completion of the procedure may be received from the S-EES 100, the T-EES 200, or the application client 53), the EEC 52 may notify the modem 51 of the completion of the procedure (or provide a notification).

In operation S504, after receiving the notification of the completion of the application context relocation from the EEC 52, the modem 51 may transmit a request message for performing a UE-initiated PDU session establishment procedure to the SMF1 441 through NAS signaling. For continuity of a service, the modem 51 may wait until receiving a notification of the completion of the application context relocation from the EEC 52 of an upper layer without performing the UE-initiated PDU session establishment procedure. As described above, since operation S505 and operation S506 are respectively the same as operation S305 and operation S306 described above with reference to FIG. 3 according to the aforementioned embodiments, an additional description will be omitted.

In addition to the embodiment described with reference to FIG. 5, the modem 51 and the EEC 52 in the UE 50 may operate as follows. The modem 51 and the EEC 52 may perform NAS control plane operation and an edge enabling layer operation in parallel. Accordingly, the UE 50 may perform the application context relocation procedure in an edge enabling layer while performing an operation of generating a new PDU session. Here, even though the operation of generating the new PDU session is completed first, the UE 50 may wait until the application context relocation procedure is completed and may then start to use the new PDU session. A specific operation is as follows. The modem 51 may receive the PDU session modification command (operation S503a), may transmit the PDU session modification command ACK (operation S503b), and may perform the operation of generating the new session by transmitting the UE-initiated PDU session establishment request message (operation S504) in parallel with performing the application context relocation procedure through the EEC 52 in the edge enabling layer. After the new PDU session is generated (after operation S504 is completed), the UE 50 may identify the completion of the application context relocation procedure through the EEC 52 and may then perform communication with the application client 53 and the T-EAS 201 through the newly generated PDU session (operation S505).

Figure 6A:
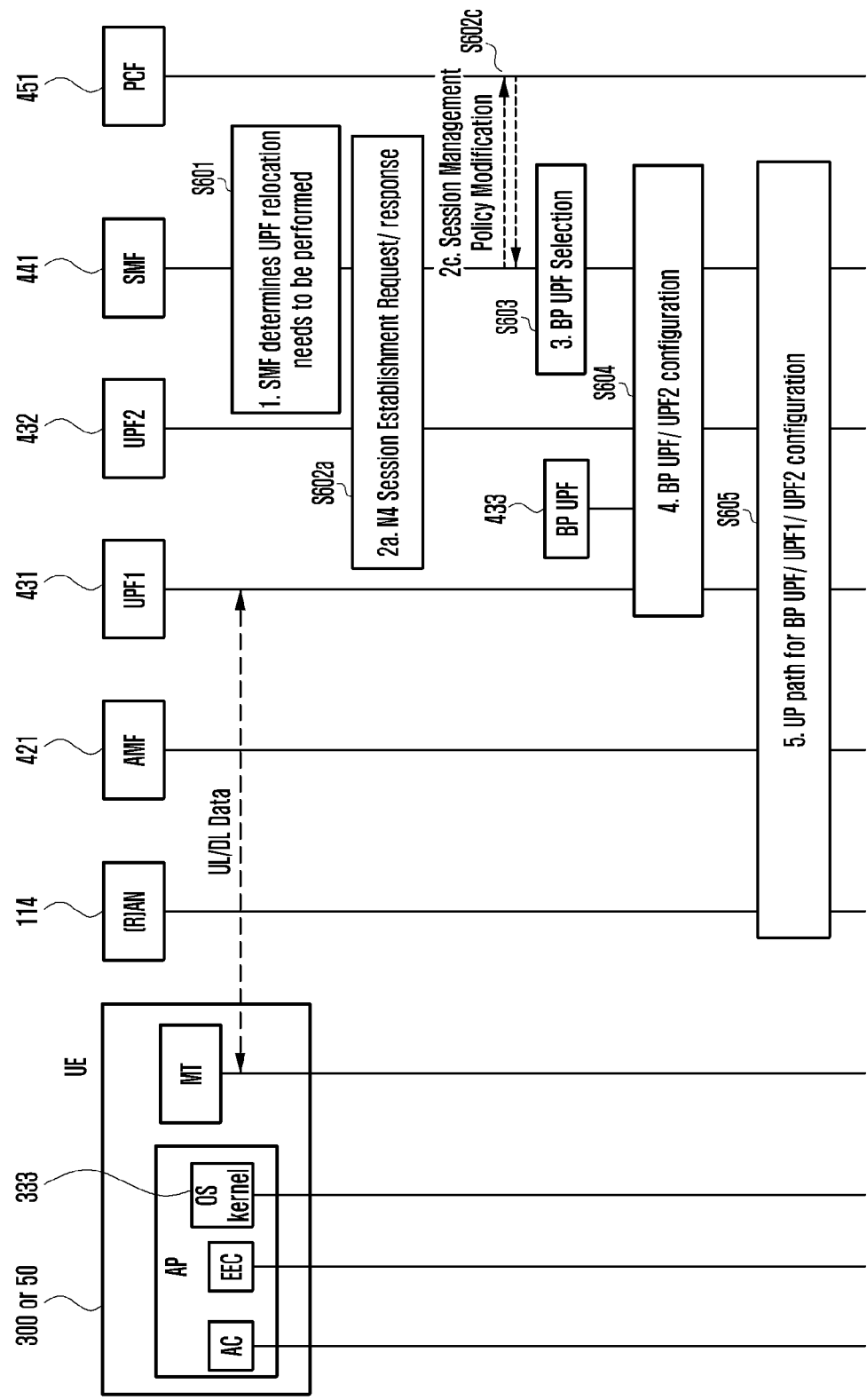
FIG. 6A illustrates a signal flowchart for providing continuity of an edge computing service based on movement of a UE according to various embodiments of the disclosure.
Figure 6B:
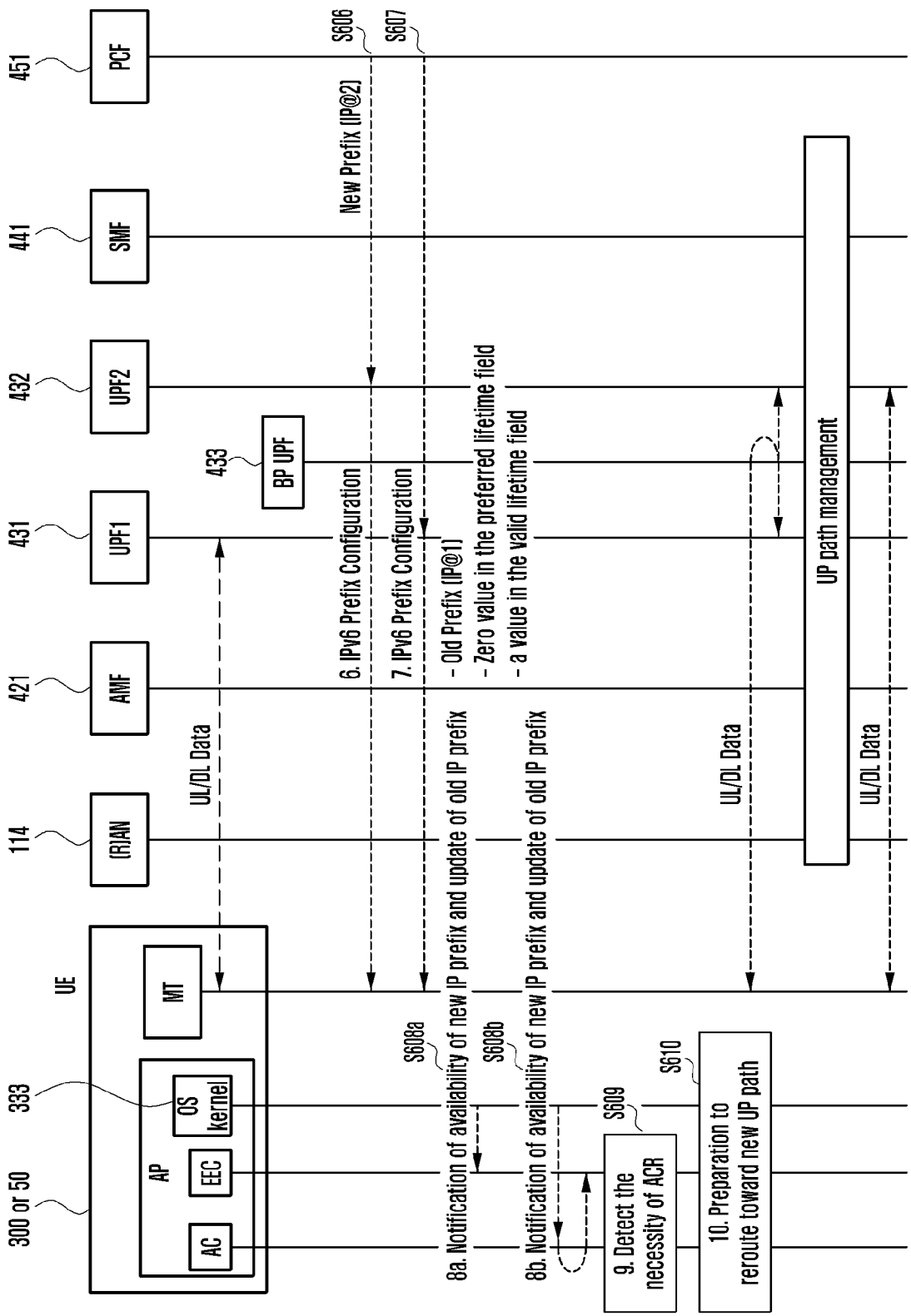
FIG. 6B illustrates a signal flowchart for providing continuity of an edge computing service based on movement of a UE according to various embodiments of the disclosure.

FIG. 6A illustrates a signal flowchart for providing continuity of an edge computing service based on movement of a UE according to various embodiments of the disclosure, and FIG. 6B is a signal flowchart for providing continuity of an edge computing service based on movement of a UE according to yet another embodiment of the disclosure.

FIG. 6A and FIG. 6B are signal flowcharts including an operation in which an operating system kernel 333 including a network stack in the UE 300 receives new IP address configuration information through a router advertisement (RA) message and the network stack provides the information included in the received message to an AC 53 or an EEC 52. Here, the network stack is a device that manages operations related to third and fourth layers.

In the following description, the flow of FIG. 6B will be described after the flow of FIG. 6A, and these operations may be performed sequentially. Therefore, in the following description, for convenience of explanation, FIG. 6A and FIG. 6B are not separately designated but will be collectively referred to as FIG. 6.

In one embodiment, a method of determining whether application context relocation is necessary using a procedure for a change of session and service continuity (SSC) mode 3 PSA with an IPv6 multi-home PDU session is provided.

Operation S601 to operation S605 may correspond to a procedure in which a 3GPP network function (NF) device detects a need for UPF relocation and performs an operation for new UP path configuration. For example, in operation S601, an SMF 441 may determine that UPF relocation needs to be performed when one of various preset reasons occurs. In operation S602*a*, based on this determination, the SMF 441 may transmit and receive an N4 session establishment request/response with a UPF2 432, which is a new UPF. In operation S602*b*, the SMF 441 may perform an operation for session management policy modification with a PCF 451. Accordingly, in operation S603, the SMF 441 may select a branching point (BP) UPF 433. When the BP UPF 433 is selected, the SMF 441 may configure a configuration for the BP UPF 433 and the UPF2 432 in operation S604. When the configuration is completed, the SMF 441 may configure a UP path of a base station ((R)AN) 114 that communicates with the UE 300, the BP UPF 433, a UPF1 431 as an existing UPF, and the new UPF2 432 in operation S605.

In operation S606, the SMF 441 may transmit a new IP prefix address (IP@2) corresponding to the UPF2 432 on the newly configured UP path to the UE 300. Specifically, new IP prefix information may be input to the operating system kernel 333 including the network stack in the UE 300, and may be provided from the network stack to the AC 53 or the EEC 52. Here, the network stack may be a block (or device) that manages the operations related to the third and fourth layers. The SMF 441 may transmit the new IP prefix address (IP@2) to the UE 300 through a router advertisement (RA) via the UPF2 432.

In operation S607, the SMF 441 may transmit an RA for updating an existing IP prefix address (IP@1) to the UE 300 via the UPF1 431. Here, in the RA for updating the existing IP prefix address, a preferred lifetime field is configured to be a value of 0, and a valid lifetime field may be configured to be a valid value (how long the SMF 441 maintains the existing IP prefix address (IP@1)). When determining the value of the valid lifetime field, a value suggested by a device (e.g., an EES (reference numeral 100 or 200 described in FIG. 1 to FIG. 3) or an EAS (reference numeral 101 or 201 described in FIG. 1 to FIG. 3)) of an edge enabling layer may also be used. For example, the EES 100 or 200 or the EAS 101 or 201 may specify the UE 300 including the EEC 52 providing the service with a UE ID and may transmit an application function request message to a mobile communication network, for example, a 3GPP network, thereby suggesting a lifetime timer value in the mobile communication network.

When receiving the RA of operation S606 and operation S607, a modem 51 in the UE 300 or the operating system kernel 333, which is an IP layer of an application processor 310, may notify the application client 53 or 301 or the EEC 52 in an upper layer of the RA in operation S608.

According to an RA notification method, the IP layer or the modem 51 may directly transmit a notification of the RA to the EEC 52 (operation S608*a*), or the IP layer or the modem 51 may transmit a notification of the RA to the application client 53, after which the application client 53 transmit the notification to the EEC 52 through EDGE-5, thereby reporting that application context relocation may be necessary (operation S608*b*).

The message reported to the EEC 52 or AC 53 may include timer information indicating when the existing UP path (UPF1) or the old IP prefix (IP@1) is released.

In operation S609, the EEC 52 or the application client 53 may determine a need to perform application context relocation based on operation S607 and may start a related procedure.

The EEC 52 may detect the need to perform application context relocation and may start a context relocation-related procedure by performing a context relocation request or performing a service provisioning/EAS discovery operation.

When the message reported to the EEC 52 or AC 53 includes the timer information indicating when the existing UP path (UPF1) is released, the following operations may be performed.

(1) The EEC 52 or the AC 53 may check a timer and may determine whether context relocation can be completed before the predetermined timer expires.

(2) A new timer value may be suggested to the modem 51 so that the existing UP path (UPF1) is not released, and accordingly a NAS message may be transmitted to the SMF 441 (a UPF1 release or old IP prefix (IP@1) release timer extension request or a terminal-suggested release timer may be included). The SMF 441 may receive the timer value suggested by the UE 300 and may delay the release time of the existing old IP prefix (IP@1) or the UPF1 431.

After completing the context relocation procedure, the EEC 52 may interwork with the application client and a lower layer to transfer existing application data traffic to the new IP prefix (IP@2) in operation S610. The EEC 52 may transmit a NAS message to the SMF 441 through the modem 51 so that the existing UP path (UPF1) is not released until the application data traffic is successfully transferred (an old UPF release timer extension request or a terminal-suggested release timer may be included). When starting communication with a T-EAS (e.g., the T-EAS 201 described in FIG. 1 to FIG. 3) through the new IP prefix address, implicit release from the existing IP prefix (IP@1) may be performed. In operation S610, the AC 53 and/or the EES 52 may interwork with the operating system kernel 333 to transmit and receive the message.

After operation S610, an operation related to UP path management may be performed between the UE 300, the UPF1 431, and the UPF2 432. Further, the operation related to UP path management may also be performed between a RAN 114, the SMF 441, the UPF1 431, and the AMF 421.

When the operation related to UP path management is completed, data transmission/reception may be performed through the UP path configured between the UE 300 and the UPF2 432.

Figure 7:
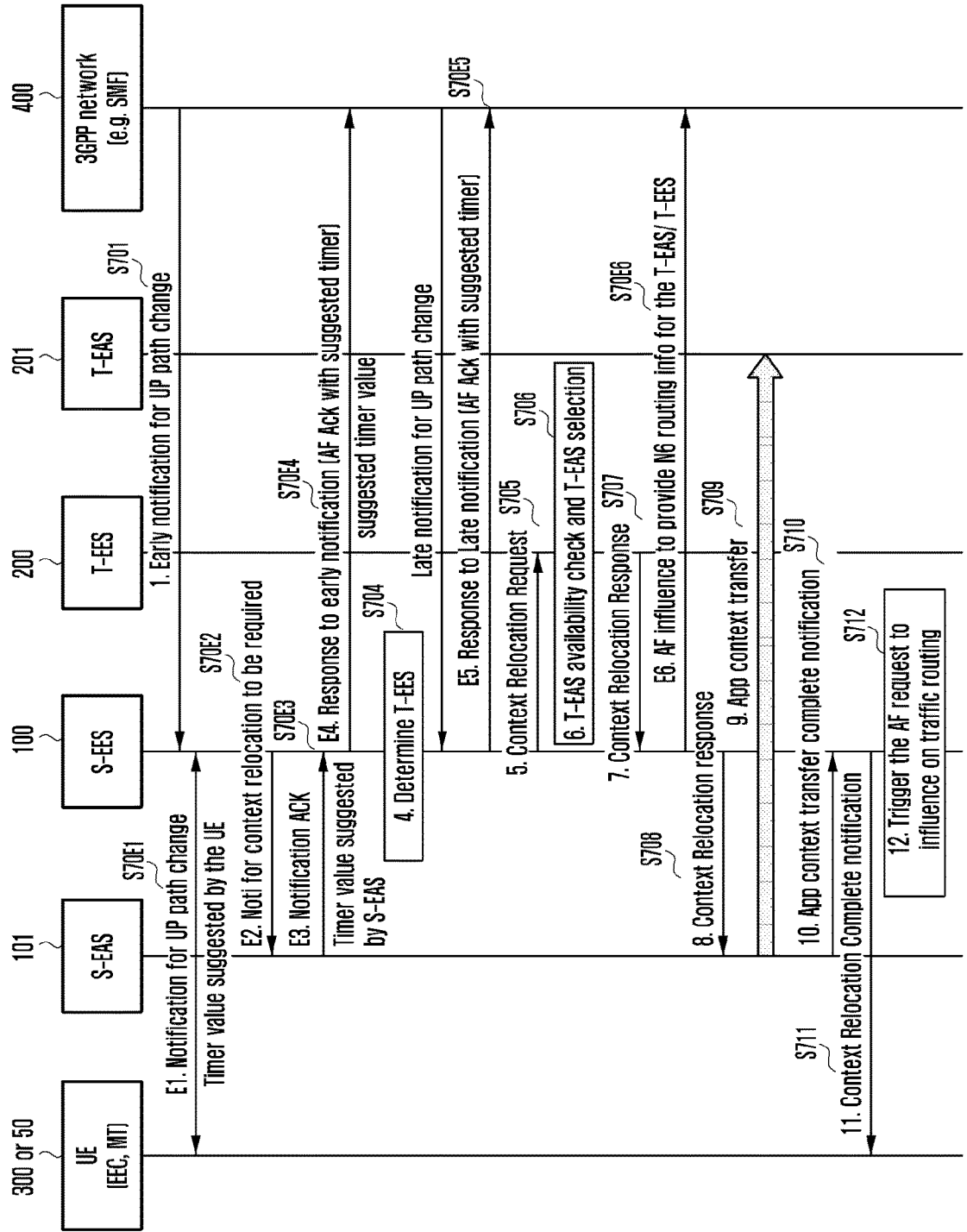
FIG. 7 illustrates a signal flowchart for providing continuity of an edge computing service based on movement of a UE according to various embodiments of the disclosure.

FIG. 7 illustrates a signal flowchart for providing continuity of an edge computing service based on movement of a UE according to various embodiments of the disclosure.

The aforementioned embodiments of FIG. 7 illustrates a method in which an edge enabling layer device provides a timer value related to UP path management to a mobile communication network, for example, a 3GPP network.

In operation S701, an S-EES 100 of the UE 300 may receive an early notification message for a UP path change from a 3GPP network 400. As illustrated in FIG. 7, the early notification message for the UP path change may be transmitted, for example, by an SMF among various network function devices of the 3GPP network 400.

Upon receiving the early notification message for the UP path change from the 3GPP network 400, the S-EES 100 may transmit the early notification message for the UP path change to the UE 300 in operation S70E1. Upon receiving the early notification for the UP path change, an EEC 52 of the UE 300 may transmit a response to the S-EES 100 while providing a suggested (preferred) timer value for UP path management (e.g., a PSA release timer value or an old IP prefix release timer value).

In operation S70E2, the S-EES 100 may transmit a notification for context relocation to be required to an S-EAS 101 in response to the received early notification from the 3GPP network.

In operation S70E3, the S-EAS 101 may provide a suggested (preferred) timer value for UP path management (e.g., a PSA release timer value or an old IP prefix release timer value) or estimated time required for application context relocation while transmitting an acknowledgment of the notification received from the S-EES 100 to the S-EES 100.

In operation S70E4, the S-EES 100 may provide the timer value provided from the UE 300 or the S-EAS 101 in the previous operation while transmitting a response (AF acknowledgement) message to the early notification to the 3GPP network 400. The SMF of the 3GPP network 400 provided with the timer value may use the timer value received from the S-EES 100 to configure an old PSA release timer, a PDU session address lifetime, an old IP prefix release timer, or the like when performing UP path management.

In operation S704, the S-EES 100 may determine a T-EES. To determine the T-EES, various factors may be used. For example, the S-EES 100 may determine the T-EES 200 by asking an ECS 30 using movement information and identification information about the UE 300, edge computing service identification information, or the like or based on information provided by the UE 300.

In addition, the S-EES 100 may receive a late notification message for a UP path change from the 3GPP network 400.

After receiving the late notification message for the UP path change from the 3GPP network 400, the S-EES 100 may transmit a timer value while transmitting a response ACK message to the notification message in operation S70E5. If necessary, even though the suggested (preferred) timer value for UP path management has already been transmitted in previous operation S70E4, the timer value may be transmitted again (the timer value may be modified and transmitted again for reconfirmation or updating).

In operation S705, the S-EES 100 may transmit a context relocation request message to the T-EES 200. In response, the T-EES 200 may check (or identify or verify) availability of a T-EAS 201 and may select a T-EAS 201 to which context can be relocated in operation S706. In selecting the T-EAS 201, when there is only one T-EAS 201, the T-EAS may be selected, and when there are two or more selectable T-EASs, one of the T-EASs may be selected. When the selection of the T-EAS is completed, the T-EES 200 may transmit a context relocation response message to the S-EES 100 in operation S707. The context relocation response message may include at least one of the availabilities of the T-EAS and information about the selected T-EAS.

After the context relocation operation is completed, the S-EES 100 may transmit an AF request message for providing N6 routing information to be applied to a newly configured UP path to the 3GPP network 400 in operation S70E6. The N6 routing information to be included in the AF request message may include routing information that needs to be applied to a UP path connected to the T-EAS 201 and the T-EES 200. Therefore, the information may be included in the AF request message provided by the S-EES 100 from the T-EES 200 or the T-EAS 201 and provided to the 3GPP network 400 (e.g., the S-EES 100 may receive the N6 routing information when receiving a message from the T-EES 200 in operation S707). Operation S70E6 of transmitting the AF request message may be performed in operation S712 after application context relocation is completed.

In operation S708, the S-EES 100 may transmit a context relocation response message to the S-ESA 101.

In operation S709, the S-EAS 101 may transmit application context to the T-EAS 201 upon receiving the context relocation response message. In operation S710, the S-EAS 101 may transmit an application context transfer complete notification message to the S-EES 100.

In operation S711, the S-EES 100 may transmit the complete notification message of operation S710 to the UE 300.

The N6 routing information included in the AF request message is routing information corresponding to the T-EES 200 or the T-EAS 201 to which the UE 300 needs to be newly connected to receive a service, and needs to be transmitted to the 3GPP network function (NEF, PCF, or SMF) through the EES or EAS serving as an AF until a new UPF is activated after the application context relocation is completed. In addition to the operations illustrated above in the embodiment, an operation of transmitting the N6 routing information from the T-EES 200 to the S-EES 100 is also included in the disclosure. Further, instead of the S-EES 100, the T-EES 200 or the T-EAS 201 may perform an AR request operation (AF request to influence traffic routing) to directly transmit the N6 routing information to the 3GPP network function.

Figure 8:
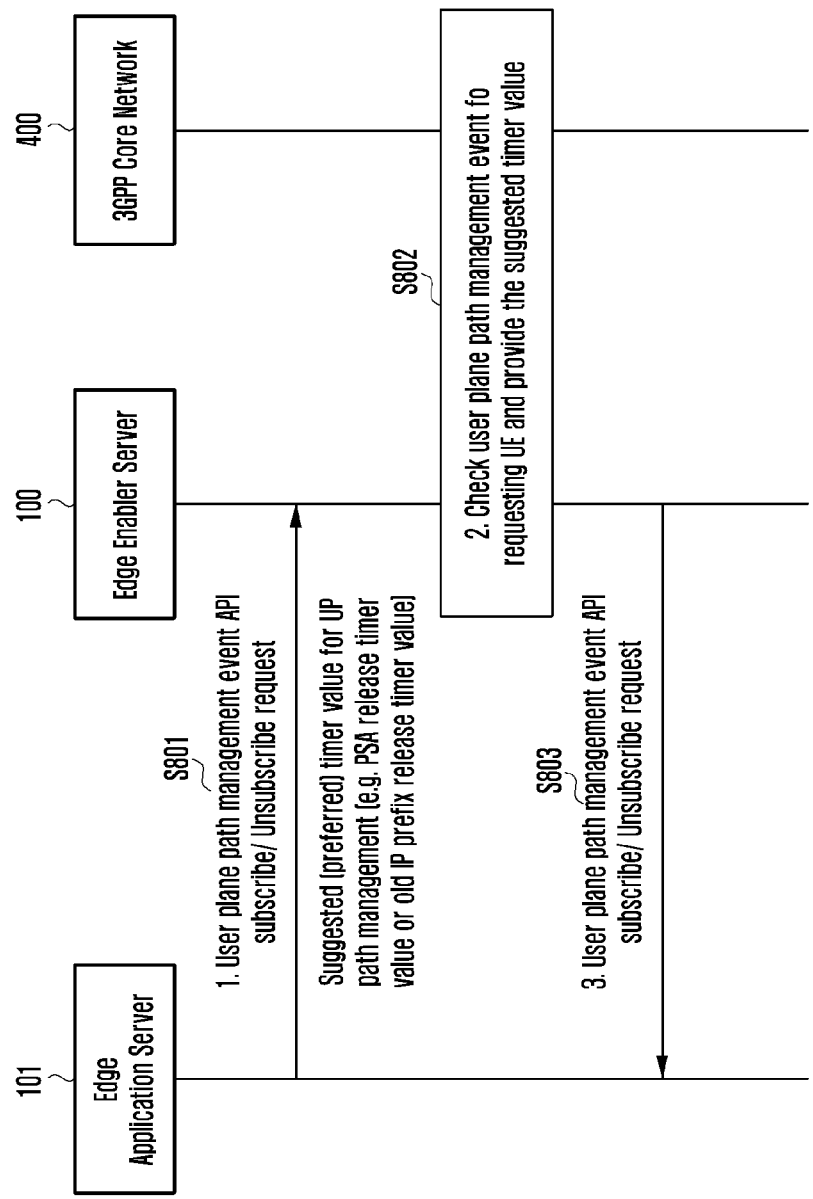
FIG. 8 illustrates a signal flowchart for providing continuity of an edge computing service based on movement of a UE according to various embodiments of the disclosure.

FIG. 8 illustrates a signal flowchart for providing continuity of an edge computing service based on movement of a UE according to various embodiments of the disclosure.

The aforementioned embodiments of FIG. 8 illustrates a method in which an EAS provides a timer value for UP path management to an EES and a 3GPP network 400 while transmitting a UP path management event API request message.

In operation S801, an EAS 101 may transmit a user plane path management event API request to an EES 100 and may also provide a suggested (preferred) timer value for UP path management (e.g., a PSA release timer value or an old IP prefix release timer value) or an estimated time required for application context relocation. Alternatively, the EAS 101 may transmit the request including a UP path management coordination indication to the EES 100 without suggesting a specific timer value. The UP path management coordination indication may include a meaning of requesting an SMF (e.g., 441 in FIG. 3) of the 3GPP network 400 to use a PSA release timer value or an old prefix release timer value that is greater than a normal value (may request use of a great value among values in a local configuration in the SMF).

In operation S802, the EES 100 may store the provided timer value and may transmit a subscription request to a UP path management event notification service using an API provided by the 3GPP network, thus providing the timer value provided from the EAS 101. When no timer value is provided from the EAS 101, the EES 100 may determine a timer value based on the local configuration and may transmit the timer value. The SMF 441 of the 3GPP network provided with the timer value may use the timer value received from the EES 100 to configure an old PSA release timer, a PDU session address lifetime, an old IP prefix release timer, or the like when performing UP path management. When receiving the UP path management coordination indication, the EES 100 may transmit the indication to the SMF 441, and the 3GPP network 400 or a function device (e.g., the SMF) may receive the indication and may then configure the PSA release timer value or the old IP prefix release timer value to be greater than the normally used value.

When failing to receive the suggested timer value for UP path management or the UP path management coordination indication from the EAS 101, the EES 100 may configure a suggested timer value, a UP path management coordination indication, or an indication of AF acknowledgment to be expected according to an EAS profile or a local configuration stored in the EES 100 and may transmit the same to the 3GPP network 400. When these parameters are included in an AF request message, a function device (e.g., an NEF, a PCF, or the SMF) of the 3GPP network 400 may perform an early notification or a late notification and may adjust the configured value of a PSA release timer or an old IP prefix release timer (e.g., use the received suggested timer value or configure the timer using a value greater than the normal configured value) to achieve runtime coordination with an AF.

In operation S803, the EES 100 may transmit a user plane path management event API subscribe/unsubscribe response to the EAS 101.

Although the disclosure illustrates an example in which the EEC 52 is configured separately from the modem, the same operations in various configuration methods are also included in suggestions of the disclosure without departing from the scope of the disclosure. For example, the operations described in the embodiments of the disclosure may also be applied to an EEC 52 being configured in a modem 51 and interworking with a lower layer within the modem. In addition, although the disclosure illustrates an embodiment of separately configuring the communication processor in which the modem 51 is configured and the application processor in which the upper layer is configured as an example, the same operations suggested in the disclosure may be applied when the communication processor and the application processor are configured together in the same processor chip.

Figure 9:
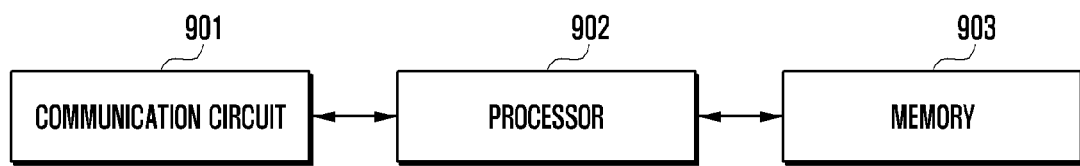
FIG. 9 illustrates a functional block diagram of a network function, an EAS, or an EES according to various embodiments of the disclosure.

FIG. 9 illustrates a functional block diagram of a network function, an EAS, or an EES according to various embodiments of the disclosure.

Referring to FIG. 9, the network function, the EAS, or the EES may include a communication circuit 901, a processor 902, and a memory 903. Each of the network function, the EAS, or the EES may include an additional component and may be configured to run in the form of software in a specific server. When running in the form of software, the network function, the EAS, or the EES may be configured in a separate slice form.

The communication circuit 901 may perform conversion and encoding/decoding in accordance with a protocol in order to communicate with a different node in a network.

The processor 902 may be configured as at least one processor and may perform an operation according to each network function.

The memory 903 may store pieces of information required for each network function and may temporarily or semi-statically store the messages described above.

Although specific embodiments have been described in the detailed description of the disclosure, various modifications are possible without departing from the scope of the disclosure. Therefore, the scope of the disclosure should not be limited to the described embodiments and should be defined not only by the claims described below but also by the claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
receiving, from an access and mobility management function (AMF), a protocol data unit (PDU) session modification command including a PDU session address lifetime value;
identifying whether a relocation of application context is necessary based on the PDU session modification command; and
transmitting, to the AMF, a PDU session modification command acknowledgement (ACK) including a suggested timer value based on the identification result,
wherein the PDU session modification command is a non-access-stratum (NAS) message.

2. The method of claim 1, wherein the PDU session modification command is transmitted from a session management function (SMF) through the AMF.

3. The method of claim 1, wherein the suggested timer value is configured to greater than a PDU session address life timer value.

4. The method of claim 1, further comprising:
transmitting, to a session management function (SMF), information indicating that the relocation of the application context is unnecessary based on the identification result.

5. The method of claim 1, further comprising:
receiving, from an edge configuration server (ECS), target edge enabler server (T-EES) information in case that the relocation of the application context is required; and
discovering a target edge application server (T-EAS) that provides mobile edge computing (MEC) services based on the T-EES information.

6. The method of claim 1, wherein the identifying is performed by an edge enabler client (EEC) of the UE.

7. The method of claim 6, wherein a notification indicating that the relocation of the application context is necessary is transmitted to an application client of the UE from the EEC based on the identification result.

8. A user equipment (UE) in a wireless communication system, the UE comprising:

a modem configured to transmit and receive signals;
an application client operably connected to the modem; and
an edge enabler client (EEC) operably connected to the application client and the modem, the EEC configured to:
receive, from an access and mobility management function (AMF) via the modem, a protocol data unit (PDU) session modification command including a PDU session address lifetime value,
identify whether a relocation of application context is necessary based on the PDU session modification command, and
transmit, to the AMF via the modem, a PDU session modification command acknowledgement (ACK) including a suggested timer value based on the identification result,
wherein the PDU session modification command is a non-access-stratum (NAS) message.

9. The UE of claim 8, wherein the PDU session modification command is transmitted from a session management function (SMF) through the AMF.

10. The UE of claim 8, wherein the suggested timer value is configured to greater than a PDU session address life timer value.

11. The UE of claim 8, wherein the EEC is further configured to:
transmit, to a session management function (SMF) via the modem, information indicating that the relocation of the application context is unnecessary based on the identification result.

12. The UE of claim 8, wherein the EEC is further configured to:
receive, from an edge configuration server (ECS) via the modem, target edge enabler server (T-EES) information in case that the relocation of the application context is required; and
discover target edge application server (T-EAS) that provides mobile edge computing (MEC) services based on the T-EES information.

13. The UE of claim 8, wherein the EEC is further configured to transmit, to the application client, a notification indicating that the relocation of the application context is necessary based on the identification result.

* * * * *